United States Patent Office 2,828,274
Patented Mar. 25, 1958

2,828,274

PERFLUOROHALOCARBOXYLIC ACID ESTER MODIFIED SOLID POLYMER OF A FLUORINE-CONTAINING OLEFIN AND PROCESS OF PREPARING THE SAME

Elizabeth Shen Lo, Elizabeth, N. J., assignor, by mesne assignments, to Minnesota Mining and Manufacturing Company, St. Paul, Minn., a corporation of Delaware No Drawing. Application June 29, 1955
Serial No. 518,953

20 Claims. (Cl. 260—31.2)

This invention relates to a novel polymeric composition and to a process for the preparation thereof. In one aspect, this invention relates to a novel normally solid fluorine-containing polymer having improved properties. In another aspect this invention relates to a process for modifying a normally solid fluorine-containing polymer. In a more particular aspect, this invention relates to a novel polymeric composition comprising a high molecular weight polymer of trifluorochloroethylene which composition has improved properties, and to a method for the preparation thereof.

High molecular weight polymers including both resinous thermoplastics and elastomers are widely used in numerous industrial applications where their unusual chemical and physical properties are used to best advantage. Among the most outstanding of the properties of high molecular weight polymers and particularly the fluorine-containing polymers such as those of trifluorochloroethylene, is chemical inertness. Thus, such polymers may be exposed to a wide variety of oxidizing, reducing and solvent type reagents such as fuming nitric acid with no apparent effect on the polymers. In addition to their high degree of chemical stability, these polymers possess high thermal stability, excellent electrical properties and can be molded into various useful items.

In many applications in which industrial users employ high molecular weight polymers such as those of trifluorochloroethylene, it is often desirable that the properties of the polymer be somewhat modified. For example, the techniques presently employed for molding polytrifluorochloroethylene thermoplastic requires the use of high temperatures ranging between about 415° F. and about 625° F., which temperatures are often necessary in order to cause the polymer to flow readily. Such temperatures, however, may also cause undesirable degradation of the polymer. In the case of elastomeric polymers such as copolymers of trifluorochloroethylene and vinylidine fluoride containing between about 30 and about 50 mol percent of combined trifluorochloroethylene, it is often desirable to modify the properties of such polymers in order to obtain improvement in their low temperature flexibility.

One method commonly used to modify the properties of such high polymers is to admix the high polymer with a plasticizer. Many of the plasticizers presently employed, however, are relatively volatile and have a tendency to bleed during fabrication of the polymer and are deleteriously effected at the temperature employed to mold the polymer and may tend to lower the degree of chemical inertness and heat stability of the polymer.

It is an object of the present invention to provide a novel solid polymeric composition having improved properties.

Another object is to provide a high polymer having improved properties, which properties will be retained under relatively extreme temperature conditions.

Another object is to provide a novel fluorine-containing plastic or elastomeric polymer composition, the properties of which are modified by a non-volatile compound which will not volatilize or bleed during fabrication of the polymer.

Another object is to provide a high molecular weight fluorine-containing polymeric composition which may be molded at a temperature at which degradation of the polymer is at a minimum.

A further object is to provide a novel thermoplastic composition of trifluorochloroethylene having improved flow properties and which can be molded at a temperature at which degradation of the polymer is at a minimum.

A further object is to provide a novel elastomeric composition of trifluorochloroethylene having improved low temperature properties.

A further object is to provide an efficient and novel process for modifying the properties of high molecular weight polymers.

A still further object is to provide a novel process for treating a normally solid polymer of trifluorchlorethylene to modify the polymer and from which the modifier will not bleed or volatilize during fabrication of the polymer.

Various other objects and advantages of the present invention will become apparent to those skilled in the art from the accompanying description and disclosure.

According to the present invention, a normally solid polymer is contacted with an ester of a perfluorohalocarboxylic acid in the presence of a peroxy compound to produce a modified normally solid polymer of improved properties. This treatment of the solid polymer is accomplished by admixing the ester with the polymer suspended in a liquid medium in finely divided form, the particle size of the suspended polymer being less than about 100 microns. Particularly good results are obtained by addition of the modifier to the polymer suspended in an organic liquid or water in finely divided form, the particle size of the suspended polymer preferably being less than about 10 microns and preferably having colloidal dimensions of the order less than about 0.1 micron in order to obtain more intimate contact between the ester modifier and polymer. The polymer which is modified to best advantage in accordance with the present invention is a normally solid fluorine-containing polymer having a high molecular weight, that is a molecular weight above about 50,000, and is preferably a high molecular weight polymer of a fluorochloroolefin containing at least two fluorine atoms, such as trifluorochloroethylene, including both resinous thermoplastics and elastomers. The esters which are used as the modifying agent include mono and polyesters of perfluorochlorocarboxylic acids and perfluorocarboxylic acids, the esters having between about 7 and about 40 carbon atoms per molecule.

The modified polymer produced in accordance with the present invention has improved flow properties being moldable at a temperature below the temperature required for molding of the untreated polymer and/or improved low temperature flexibility, which improved properties are obtained without deleterious effect on the chemical inertness and heat stability of the polymer.

In accordance with the process of the present invention normally solid polymers are modified with the ester of a perfluorohalocarboxylic acid in the presence of a peroxy compound or promoter. Such peroxy compounds comprise the inorganic and organic peroxides which are preferably water soluble peroxides. Examples of suitable inorganic peroxides are the water-soluble peroxides such as the perborates, persulfates, perphosphates, percarbonates, barium peroxide, zinc peroxide and hydrogen peroxide. Particularly valuable are the water soluble salts of the peracids such as the sodium, potassium, calcium, barium and ammonium salts of the persulfuric and perphosphoric acids. Examples of suitable organic peroxides comprise the water soluble peroxides such as trichloroacetyl peroxide, perfluoropropionyl peroxide, diacetyl peroxide, 3,4-dibromobutyryl peroxide, 1-methoxycyclopentyl peroxide, 3-carboxypropionyl peroxide, dichlorofluoroacetyl peroxide; 2,2,3,3,4,4-hexafluorobutyryl peroxide and the like. Such promoters are admixed with the modifier and polymer in a weight ratio of promoter to polymer of between about 0.001:1 and about 0.2:1, and preferably in a weight ratio of between about 0.01:1 and about 0.1:1.

It has been found that the properties of the polymer are modified by as little as 0.01 weight percent of the ester (or a weight ratio of ester to polymer of about 0.0001:1) and that the weight ratio of the modifier to polymer may vary over relatively wide limits to obtain varying degrees of modification of the polymer. Generally, however, the weight ratio of modifier to polymer which is employed ranges between about 0.05:1 and about 2:1 and preferably between about 0.1:1 and about 1:1.

The treatment of the solid polymer and the ester is accomplished over a relatively wide range of temperatures such as between about 0° C. and about 150° C. and, in general, a temperature within the range between about 10° C. and about 50° C. is employed. The reaction time may similarly vary over relatively wide limits such as between about one-half hour and about 100 hours although in most instances modification of the polymer is effected in less than 75 hours. The process of the present invention may be carried out at atmospheric pressure or under superimposed pressures up to 1000 pounds per square inch gage.

As above-stated esters of perfluorohalocarboxylic acids are employed as the modifiers of the present invention and may contain between about 7 and about 40 carbon atoms per molecule. The ester group of the modifier may be an alkyl, alkenyl and aryl radical and includes the substituted and unsubstituted radicals preferably having between about 1 and about 20 carbon atoms per radical. The acids from which the esters are prepared may be perfluorochloro- and perfluoro mono- and diacids and are preferably those having between about 6 and about 20 carbon atoms per molecule and in which at least one-half of the total number of the halogen substituents are fluorine atoms.

The perfluoro and perfluorochloro acids, the ester derivatives of which are used in accordance with the present invention, are obtained by a variety of procedures, such as the oxidation of a perhalogenated olefin which is at least half fluorinated and which is the product of thermal cracking of high molecular weight homopolymers or copolymers of perfluoro and/or perfluorochloroolefins. The oxidation of the perhalogenated olefin is preferably carried out in the presence of potassium permanganate at a temperature below 80° C. and preferably at a subzero temperature such as −10° C. The perfluorohalo acids may also be produced by hydrolyzing with fuming sulfuric acid, the telomer product obtained by telomerizing an olefin which is at least half fluorinated such as trifluorochloroethylene, in the presence of a perhalogenated methane or a sulfuryl halide. The hydrolysis of such a telomer product in fuming sulfuric acid is carried out at a temperature between about 140° C. and about 300° C. Other ester derivatives of carboxylic acids which may be employed as the modifier of the present invention include the ester derivatives of the polyfluoro and polyfluorochloro acids disclosed in U. S. Patent Nos. 2,559,752 and 2,559,629, respectively.

The esters are produced by a variety of procedures one of which is the direct esterification of a perfluorohalocarboxylic acid or perfluorohalo acid chloride with an alcohol or phenol in the presence or absence of a catalyst. Another method for the preparation of these compounds is the alcohol exchange reaction in which the perfluorohalocarboxylic acid is reacted with an ester of another acid, for example, acetic acid or any other acid having a boiling point lower than that of the perfluorohalo acid. Other methods include the acid exchange and the ester exchange reactions.

The compounds which may be reacted with the perfluorohalo acids to produce the esters used in accordance with the present invention contain at least one hydroxy group and include substituted and unsubstituted phenols, aromatic alcohols and saturated and unsaturated aliphatic alcohols containing between about 1 and about 20 carbon atoms per molecule. Such hydroxy-containing compounds may be substituted, for example, with halogen and nitrogen. Typical examples of suitable phenols which may be employed are methyl phenol, ethyl phenol, isomeric cresols, orthohydroxychlorostyrene, alpha- and beta-naphthols and dimethyl amino phenol. Suitable aromatic alcohols which may be employed are cinnamyl, benzyl and alkyl phenoxy ethanols. Suitable saturated aliphatic alcohols, including both monohydroxy and polyhydroxy alcohols, which may be employed are those of the homologous series methyl, ethyl, propyl . . . eicosyl alcohols, dichlorohydrin, 2-dimethylamino ethanol, ethylene glycol, pentamethylene glycol, glycerol, erythritol, heptitol, chloral hydrate, triethanolamine, cyclohexanol and glycidol. Illustrative of the unsaturated aliphatic alcohols are allyl, crotyl and tiglyl alcohols, chloroallyl and bromocrotyl alcohols, fluorohexenol, cyclopentenol, cyclohexenol, hexenol, pentenol and octylnediol.

The preparation of the ester modifiers of the present invention is carried out by reaction of the acid or acid chloride with the hydroxy-containing compound at a temperature between about 0° C. and about 250° C., and preferably at a temperature between about 10° C. and about 100° C. The esters begin to form as soon as the hydroxy compound is mixed with the acid or acid chloride, and the reaction is run to completion for a time which may be between a few minutes and 96 hours, and preferably between a few minutes and 48 hours. Generally speaking, the esterification reaction using the higher molecular weight alcohols require the longer reaction times. When the esters are prepared by reaction of the hydroxy compound and the free perfluorohalocarboxylic acid, it is desirable in most cases to remove water in order to produce greater yields of the ester.

The ester modifiers which are particularly effective in modifying the properties of a high molecular weight polymer containing at least 2 fluorine atoms for every chlorine atom are the ester derivatives of perfluorochlorocarboxylic acids containing at least 2 fluorine atoms for every chlorine atom. Such esters are the preferred modifiers for improving the properties of normally solid polymers of fluorine-containing olefins containing at least 2 fluorine atoms for every chlorine atom inasmuch as they are similar in structure to and are essentially completely compatible with such fluorochlorocarbons. Typical examples of these preferred esters are those having the general formulas:

(1)
$$Z-(CF_2-CFCl)_{n-1}CF_2-\overset{O}{\underset{\|}{C}}-OR$$

and (2)
$$RO-\overset{O}{\underset{\|}{C}}-CFCl-(CF_2CFCl)_{n-2}CF_2-\overset{O}{\underset{\|}{C}}-OR$$

wherein Z is selected from the group consisting of chlorine and perhalomethyl radicals having a total atomic weight not in excess of 146.5, n is an integer from 2 to 10, and R is selected from the group consisting of substituted and unsubstituted alkyl, alkenyl and aryl radicals having not in excess of about 20 carbon atoms. Such esters are prepared as above-described by treating the above-mentioned hydroxy compounds with the hydrolysis products of telomers produced by telomerizing trifluorochloroethylene with a bromohalomethane such as, for example, bromotrichloromethane or with a sulfuryl halide such as, for example, sulfuryl chloride. These telomers are respectively represented by the following general formulas:

(3) $\quad M(CF_2CFCl)_n{-}Br$
(4) $\quad Y_1(CF_2CFCl)_n{-}Y_2$ wherein M is a perhalomethyl radical having a total atomic weight not higher than 146.5, and $n$ is an integer from 2 to 10, $Y_1$ is a halogen selected from the group consisting of fluorine, chlorine and bromine and $Y_2$ is a halogen selected from the group consisting of bromine and chlorine. Oftentimes the hydrolysis products of such telomers represent mixtures of acids, which mixtures are esterified to produce mixtures of esters. Such mixtures may also be employed to advantage as the modifier without departing from the scope of the present invention.

Typical examples of the preferred ester modifiers employed by the process of the present invention are those listed in the following Table I.

described herein are the homopolymers of fluoromonoolefins such as vinylidene fluoride, tetrafluoroethylene, trifluorochloroethylene, bromotrifluoroethylene; homopolymers of fluorine-containing dienes such as 1,1-difluorobutadiene, 1,1,2-trifluorobutadiene, 1,1,3-trifluorobutadiene, 1,1 - difluoro - 3 - methylbutadiene, 2 - trifluoromethylbutadiene; homopolymers of fluorine-containing alpha-methylene carboxylic acids and derivatives such as alpha-trifluoromethyl acrylonitrile and methyl alpha-trifluoromethacrylate; and the homopolymers of fluorinated styrenes such as phenyl trifluoroethylene.

Copolymers which may be modified by the process of the present invention include those obtained from any of the above-mentioned fluorine-containing monomers as well as from trifluoroethylene, dichlorodifluoroethylene, 3,3,3-trifluoropropene, perfluoropropene and perfluoroisobutene, and a polymerizable unsaturated olefin. The polymerizable unsaturated olefin comonomer is preferably an olefin having not in excess of about 10 carbon

TABLE I

*Physical properties of esters of perfluorochlorocarboxylic acids*

| Ester | Boiling point | | Index of Refraction, $n_D^{20}$ | Density $d_4^{20}$ |
|---|---|---|---|---|
| | °C. | mm. Hg | | |
| (1) methyl 3,5,6-trichlorooctafluorohexanoate $Cl(CF_2CFCl)_2CF_2COOCH_3$ | 87 | 10.0 | 1.3834 | 1.74 |
| (2) methyl 3,5,7,8-tetrachloroundecafluorooctanoate $Cl(CF_2CFCl)_3CF_2COOCH_3$ | 131.5-133 | 760.0 | 1.3952 | 1.826 |
| (3) butyl 3,5,7,8-tetrachloroundecafluorooctanoate | 105-107 | 0.45 | 1.4001 | 1.635 |
| (4) octyl 3,5,7,8-tetrachloroundecafluorooctanoate | 155 | 0.1 | 1.4104 | 1.41 |
| (5) octadecyl 3,5,7,8-tetrachloroundecafluorooctanoate | 200 | 0.1 | 1.4279 | 1.290 |
| (6) pentaerythritol monoester of 3,5,7,8-tetrachloroundecafluorooctanoic acid | | | 1.4217 | |
| (7) dipropyl 3,5,7-trichlorononafluorosuberate $C_3H_7OOC{-}(CF_2CFCl)_3{-}COOC_3H_7$ | 118-122 | 0.6 | 1.3952 | 1.49 |
| (8) dioctyl 3,5,7-trichlorononafluorosuberate | 180 | 0.07 | 1.420 | 1.265 |
| (9) allyl 3,5,6-trichlorooctafluorohexanoate | 101.5 | 10.0 | 1.3960 | 1.62 |
| (10) allyl 3,5,7,8-tetrachloroundecafluorooctanoate | 160 | 1.0 | 1.4026 | 1.704 |
| (11) diallyl 3,5,7-trichlorononafluorosuberate | 160 | 6.0 | 1.4068 | 1.546 |
| (12) diester of pentamethylene glycol and 3,5,7,8-tetrachloroundecafluorooctanoic acid | | | 1.4118 | 1.750 |

Other typical examples of these preferred esters are propyl, octyl, octadecyl, vinyl, and allyl 3,5,6-trichlorooctafluorohexanoate; propyl, vinyl and phenyl 3,5,7,8-tetrachloroundecafluorooctanoate; dimethyl, dibutyl, dioctadecyl, divinyl and diallyl 3,5-dichlorohexafluoroadipate; and dimethyl, dibutyl and divinyl 3,5,7-trichloroperfluorosuberate.

Other types of suitable esters are the tetraesters obtained by the reaction between a polyhydroxy alcohol and a mono- and a di-perfluorochlorocarboxylic acid. For example, reaction between pentamethylene glycol and 3,5,7,8-tetrachloroundecafluorooctanoic acid and 3,5,7-trichlorononafluorosuberate leads to the production of the tetraester having the formula, $Cl(CF_2CFCl)_3CF_2COO(CH_2)_5OOC(CF_2CFCl)_3COO(CH_2)_5OOC{-}(CF_2CFCl)_3CF_2Cl$ and having an index of refraction $(n_D^{21.5})$ of 1.4157 and a density $(d_4^{20})$ of 1.734.

Typical examples of suitable esters of perfluorocarboxylic acids which may be employed are diethyl perfluorosebacate, diethyl perfluoroadipate, diisopropyl perfluoroadipate, and diallyl perfluoroadipate.

The polymers which are modified to best advantage by the process of the present invention are the normally solid high molecular weight resinous thermoplastic and elastomeric polymers obtained by polymerization of a fluorine-containing olefin, which olefin is preferably one containing at least two fluorine atoms per molecule and not in excess of about 10 carbon atoms per molecule. The polymers which are markedly improved by the modifiers of the present invention and especially by the esters of the perfluorochlorocarboxylic acids are polymers of a fluorochloroolefin which is preferably a perfluorochloroolefin having not more than about 5 carbon atoms per molecule.

Typical examples of polymers which are modified as atoms per molecule and includes substituted and unsubstituted ethylenically mono- and di-unsaturated hydrocarbons, derivatives of alpha-methylene carboxylic acids, vinyl ethers and alkyl acrylates. Typical examples of such copolymers are those of trifluorochloroethylene and vinylidene fluoride, which may be either thermoplastic or elastomeric, trifluorochloroethylene and tetrafluoroethylene, trifluorochloroethylene and vinyl fluoride, trifluorochloroethylene and vinylidene chloride, trifluorochloroethylene and hexafluoropropene, trifluorochloroethylene and trifluoroethylene, tetrafluoroethylene and 1,1-chlorofluoroethylene, vinylidene fluoride and 1,1-chlorofluoroethylene, vinylidene fluoride and perfluoropropene, tetrafluoroethylene and butadiene, trifluorochloroethylene and n-butyl acrylate, trifluorochloroethylene and 1,1,2,2-tetrafluoroethyl vinyl ether, and trifluorochloroethylene and 1,1-difluorobutadiene.

It has been found that when the resinous thermoplastic polymers of a fluorochloroolefin, in which at least half of the total number of halogen substituents are fluorine atoms, are modified with the esters of perfluorochlorocarboxylic acids in which the only hydrogen atoms are those in the ester group, the flow properties of such polymers are greatly improved without any loss of the desirable properties of the untreated polymer such as chemical inertness and heat stability. Particularly good results are obtained when high molecular weight polytrifluorochloroethylene thermoplastic and the copolymer of trifluorochloroethylene and vinylidene fluoride containing above about 69 and preferably less than about 80 mol percent of combined trifluorochloroethylene are modified with the esters of the perfluorochloro acids such as allyl 3,5,7,8-tetrachloroperfluorooctanoate and diallyl 3,5-dichloroperfluoroadipate. Such modified compositions are molded at a temperature below that which is ordinarily required to mold the untreated polymer, and degradation of the modified polymer is at a minimum.

It has also been found that the modifiers of the present invention and preferably the esters of perfluorochlorocarboxylic acids such as diallyl 3,5,7-trichloroperfluorosuberate improve the low temperature flexibility of elastomeric polymers such as the trifluorochloroethylene-vinylidene fluoride copolymer preferably containing between about 30 and about 50 mol percent of combined trifluorochloroethylene.

The esters of the perfluorocarboxylic acids, on the other hand, have their greatest effect on improving the properties of polymers in which fluorine is the sole halogen substituent such as high molecular weight polytetrafluoroethylene homopolymer.

In order to obtain the maximum degree of intimate contact between the polymer, modifier and peroxy compound, the modifier and peroxy compound are preferably added to a suspension or dispersion of the polymer in a liquid medium. Such a technique leads to markedly improved modification of the polymers, and volatilization or bleeding of the modifier from the polymer during its fabrication has been found to be negligible when such a technique is employed. Typical dispersions of polymers which may be treated in accordance with the process of the present invention are those disclosed in U. S. Patent Nos. 2,686,738, 2,686,767 and 2,686,770.

The modifier and peroxy compound are preferably added directly to the aqueous suspension or dispersion of high polymer as it is obtained from the polymerization zone. Such dispersions of polymers such as those of trifluorochloroethylene are obtained by conducting the polymerization in an aqueous suspension type catalyst system in which a water soluble peroxy promoter is employed with or without the addition of an activator, accelerator or emulsifier. The peroxy promoters which may be used comprise any of the inorganic water soluble peroxy compounds mentioned hereinabove and are preferably employed in a concentration between about 0.01 and about 2 percent by weight based on water. The activators which are often used in conjunction with the promoter comprise sodium bisulfite, sodium metabisulfite, sodium thiosulfate, trimethylamine, and, in general, any water soluble reducing agent. Equimolar amounts of the promoter and activator are preferred. The accelerators comprise water soluble variable valence metal salts of sulfates, nitrates, phosphates and chlorides such as cuprous sulfate, ferrous sulfate and silver nitrate.

The emulsifiers which may be employed in the preparation of the polymers which are modified by the process of the present invention comprise metal salts such as the potassium or sodium salt derivatives derived from saturated aliphatic acids, the optimum chain length of the acid being between about 14 and about 20 carbon atoms, and the metal salts of perfluorochlorocarboxylic and polyfluorocarboxylic acids. The preferred emulsifiers are the metal salts of the acids obtained upon hydrolysis of the trifluorochloroethylene-sulfuryl chloride telomers in sulfuric acid and contain an even number of carbon atoms. The emulsifier is generally present in a quantity between about 0.5 and about 10 parts by weight per 100 parts of total monomer or monomers.

Buffering agents may also be employed to maintain appropriate pH conditions during the polymerization reaction. Typical examples of suitable buffering agents are disodium hydrogen phosphate and sodium metaborate.

The polymerizations are conducted at a temperature between about 0° C. and about 75° C. and preferably at a temperature between about 5° C. and about 30° C. for a reaction time ranging between about 10 and about 35 hours. The polymerization may be conducted in a batchwise manner under autogenous conditions of pressure by charging the total quantity of monomer at the start of the reaction. The polymerization may also be conducted in a continuous manner by introducing the monomer continuously while withdrawing polymer product continuously at a constant temperature and pressure.

A typical example of one type of aqueous polymerization recipe which may be employed to prepare the aqueous dispersions of polymers modified by the process of the present invention is the following aqueous emulsion system:

| | Parts by weight |
|---|---|
| Water | 300.0 |
| Total monomer or monomers | 100.0 |
| Potassium persulfate | 2.5 |
| Potassium 3,5,7,8-tertachloroundecafluorooctanoate | 4.5 |
| Buffer | 3.6 |

In some instances it may be desirable to add a compound to the dispersion of polymer before it is treated with the modifier, which compound will prevent coagulation of the dispersion. This may be accomplished by the addition of the metal salts of perfluorohaloalkanoic acids which are preferably the salts of the acids from which the ester modifier is derived. When the process of the present invention is carried out with the addition of such dispersion stabilizing compounds, they are added to the dispersion in an amount ranging between about 0.01 and about 2 weight percent based on 100 parts of polymer, but generally not more than about 1 weight percent is required. When the dispersion of solid polymer which is treated with the ester modifier is used as it is prepared in the polymerization zone and when the polymerization is conducted in an aqueous suspension catalyst system in which a metal salt of a perfluorohaloalkanoic acid is used as the emulsifier, there is often a sufficient quantity of such salt in the dispersion to prevent coagulation of the dispersion so that additional amounts do not have to be added.

The admixture of the dispersion of polymer and ester modifier is accomplished with moderate agitation. The mixture thus obtained may be applied directly as such to a surface such as a metal or fabric surface by conventional spraying or dipping techniques to obtain more flexible and improved protective coatings. Alternatively, the dispersion of the modified polymer may be allowed to settle, or the more stable dispersions may be coagulated by conventional techniques such as by freezing in a solid carbon dioxide-acetone bath.

The modified polymeric compositions of the present invention in the form of dry molding powder may be molded by using suitable molding equipment at a temperature between about 200° F. and about 450° F. and at a pressure between about 500 and about 25,000 pounds per square inch. The molding is accomplished with negligible thermal degradation of the polymer and with a minimum amount of bleeding of the added ester of the perfluorohalocarboxylic acid.

There is indication that the peroxy promoter used in accordance with the present invention leads to a chemical reaction between the polymer and ester modifier to produce a cross-linked polymer in which the ester modifier is chemically bonded to the polymer. The cross-linking which is promoted by the presence of the peroxy compound is particularly apparent when an unsaturated ester such as diallyl 3,5,7-trichlorononafluorosuberate is employed as the ester modifier. Due to the fact that cross-linking is facilitated by the unsaturation present in the vinyl and allyl esters, these are the particularly preferred modifiers of the present invention.

When the aqueous dispersions of the polymers which are treated in accordance with the present invention are prepared in a polymerization catalyst system comprising a water soluble peroxy promoter such as potassium persulfate, oftentimes there is a sufficient amount of the peroxy compound to promote cross-linking of the modifier and polymer and thus additional quantities of the promoter do not have to be added. The above cause for the improved results obtained by the present method and composition is merely theoretical and other theories or reasons may equally well explain the invention and may ultimately be found to be the true cause.

The following examples are offered as a better understanding of the present invention and are not to be construed as unnecessarily limiting thereto.

EXAMPLE 1

This example illustrates the modification of normally solid high molecular weight polytrifluorochloroethylene with the unsaturated ester, diallyl 3,5,7-trichlorononafluorosuberate, having the formula,

in the presence of a peroxy promoter.

(A) The high molecular weight polytrifluorochloroethylene employed in this example was prepared in accordance with the following procedure: A glass polymerization tube was evacuated, flushed with nitrogen and charged with 36 grams of potassium persulfate, 67.5 grams of 3,5,7,8-tetrachloroundecafluorooctanoic acid, 54 grams of disodium hydrogen phosphate, 4500 grams of water and 1500 grams of trifluorochloroethylene. The pH of this solution was adjusted to a value of 8.5 by the addition of about 7.4 grams of potassium hydroxide thereby forming the potassium salt of the perfluorochlorooctanoic acid. The polymerization was conducted at room temperature (22° C.) for a period of 22 hours to obtain an aqueous dispersion or suspension of polytrifluorochloroethylene in finely divided form. At the end of the polymerization the unreacted monomer was completely removed by flash distillation. The polytrifluorochloroethylene polymer thereby produced had an N. S. T. value of 300.

(B) An aliquot (30 ml.) of the aqueous dispersion obtained according to the procedure of part A of this example was charged to a glass flask. There were then added 2 grams of diallyl 3,5,7-trichlorononafluorosuberate and 0.1 gram of potassium persulfate. The flask was then stoppered and moderately shaken in a shaking machine at room temperature (22° C.) for a period of 68 hours. At the end of this period the reaction mixture was coagulated by freezing it in a solid carbon dioxide-acetone bath. The product was collected and washed with hot water and dried in vacuo at 35° C. Analysis of the product showed it to contain 83.5 mol percent of trifluorochloroethylene and 16.5 mol percent of the diallyl ester.

Infrared analysis of this product showed strong absorption at 5.60 microns indicative of the presence of the carboxyl group

and weak absorption at 6.03 microns indicating the presence of an ethylenic double bond. The product was then thoroughly washed with acetone to remove any of the unreacted diallyl ester. The product was then dried and again submitted to infrared analysis. The washed and dried product still showed strong absorption at 5.60 microns indicative of the presence of the carboxyl group in the product, but did not show absorption at 6.03 microns thereby indicating the product to be free of ethylenic unsaturation. It is therefore shown that the diallyl ester modifier was chemically bonded to the polymer product.

A 2.0 gram sample of this modified polymer of polytrifluorochloroethylene thermoplastic was submitted to compression molding which involved preheating the sample at 400° F. for four minutes followed by pressing for two minutes at 400° F. under a pressure of 20,000 pounds per square inch. A clear, continuous, transparent, non-greasy and tough polymer sheet was obtained.

(C) A 30 ml. aliquot of the aqueous dispersion of the polymer obtained according to the procedure of part A of this example was coagulated by freezing in a solid carbon dioxide-acetone bath. The coagulated polymer, 2.0 grams of diallyl 3,5,7-trichlorononafluorosuberate and 0.1 gram of potassium persulfate, were admixed in the dry state for a period of 48 hours at 22° C. The polymer product thereby produced was sumbitted to compression molding at 400° F. under the same conditions as described in part B of this example. A slightly greasy, clear, continuous, transparent and tough polymer sheet was obtained.

EXAMPLE 2

This example further illustrates the modification of normally solid high molecular weight polytrifluorochloroethylene with ester derivatives of perfluorochlorocarboxylic acids in the presence of a peroxy compound.

The high molecular weight polytrifluorochloroethylene having an N. S. T. value of 300 and employed in this example was prepared in accordance with the same procedure set forth in part A of Example 1 above.

Run numbers 3, 4, 5, and 6 of the following Table II were made in a glass stoppered flask to which an aqueous dispersion of high molecular weight polytrifluorochloroethylene thermoplastic, 2.0 grams of ester modifier and 0.1 gram of potassium persulfate were charged, the volume of the aqueous dispersion which was added and the particular modifier used in each run being as indicated in Table II. There were approximately 3.4 grams of polymer per 30 ml. of aqueous dispersion or about 12 percent solids content. In each run the stoppered flask was then moderately shaken in a shaking machine at 20° C. for the time indicated in Table II. At the end of each period the reaction mixtures were coagulated by freezing in a solid carbon dioxide-acetone bath. The coagulated product was collected, washed with hot water and dried in vacuo at 35° C. In run number 1 of Table II, 30 ml. of an aqueous dispersion of polytrifluorochloroethylene thermoplastic was shaken at 20° C. for a period of 68 hours without the addition of any modifier. In run number 2 of Table II, 30 ml. of the aqueous dispersion of polytrifluorochloroethylene thermoplastic was shaken at 20° C. for a period of 21 hours in the presence of 1.0 gram of potassium persulfate without the addition of any modifier. Otherwise the conditions of run numbers 1 and 2 were the same as in run numbers 3, 4, 5 and 6.

In each of run numbers 3, 4, 5 and 6 a 2.0 gram sample of the modified polymer of polytrifluorochloroethylene thermoplastic was submitted to compression molding which involved preheating the sample at 400° F. for four minutes followed by pressing for two minutes at 400° F. under a pressure of 20,000 pounds per square inch. The diameter of the pressed sheet was measured as an indication of the relative flow character as compared to the unmodified sheet of polytrifluorochloroethylene. The results of these experiments are given in Table II. In each case a clear, transparent, continuous and tough plastic sheet was obtained with essentially no volatilization or "bleeding" of the ester during the pressing operation.

A 2.0 gram sample of the unmodified polymer of run number 1 was similarly pressed, except that a temperature of 500° F. was required to obtain a suitable flow of polymer for the molding operation. A 2.0 gram sample of the unmodified polymer of run number 2 was also similarly pressed except that a temperature of 475° F. and a pressing time of six minutes were required in order to obtain a suitable flow of polymer.

TABLE II

*Treatment of polytrifluorochloroethylene plastic[a] at 20° C.*

| Run No. | Modifier (2 grams) | Amount of Polymer Dispersion (ml.)[b] | Reaction Time (hours) | Yield (grams) | Diameter of Pressed Modified Polymer (inches) |
|---|---|---|---|---|---|
| 1 | none | 30 | 68 | 3.7 | 3.5 (at 500° F.) |
| 2[c] | none | 30 | 21 | 6.1 | |
| 3 | methyl 3,5,6-trichlorooctafluorohexanoate— Cl(CF₂CFCl)₂CF₂COOCH₃ | 30 | 92 | 3.14 | 5.0 (at 400° F.) |
| 4 | octyl 3,5,7,8-tetrachloroundecafluorooctanoate | 30 | 92 | 5.0 | |
| 5 | dioctyl 3,5,7-trichlorononafluorosuberate | 30 | 92 | 4.8 | 5 (at 400° F.) |
| 6 | diallyl 3,5,7-trichlorononafluorosuberate | 30 | 48 | 5.0 | 9.0 (at 400° F.) |

[a] NST value=300° C.
[b] Approximately 12 percent solids content.
[c] 1.0 gram of potassium peroxide added.

EXAMPLE 3

This example illustrates the modification of a high molecular weight fluorine-containing elastomer with the unsaturated ester, diallyl 3,5,7-trichlorononafluorosuberate in the presence of a peroxy compound.

(A) The elastomer which was modified by the procedure of this example contains 30 mole percent of combined trifluorochloroethylene and 70 mole percent of combined vinylidene fluoride, and was prepared by the following polymerization reaction:

A stainless steel polymerization bomb was charged with 200 grams of water, 1.0 gram of potassium persulfate, 0.4 gram of sodium metabisulfite, 0.1 gram of ferrous sulfate heptahydrate and 1.0 gram of potassium 3,5,7,8-tetrachloroundecafluorooctanoate. The bomb was then evacuated and connected to a steel cylinder equipped with a pressure gage and a needle valve located between the bomb and the steel cylinder. The steel cylinder contained 25 mole percent of trifluorochloroethylene and 75 mole percent of vinylidene fluoride. This monomer mixture was fed into the polymerization bomb at a pressure of 200 pounds per square inch gage and at a temperature of 35° C. for a period of 18 hours. At the end of this period unreacted monomers were removed from the polymerization bomb by flash distillation. A portion of the latex in the bomb was coagulated, washed with hot water and dried. Fluorine and chlorine analysis of the rubbery product showed it to contain 30 mole percent of combined trifluorochloroethylene and 70 mole percent of combined vinylidene fluoride. Another portion of this latex gave a positive test when treated with potassium iodide and sodium thiosulfate thereby indicating the latex to contain unreacted potassium persulfate.

(B) To a glass flask there were charged 30 ml. of the latex obtained by the procedure of part A of this example, 0.5 gram of diallyl 3,5,7-trichlorononafluorosuberate, and 10 cc. of an aqueous solution containing 0.1 gram of dissolved potassium 3,5,7,8-tetrachloroundecafluorooctanoate. The flask was then moderately shaken on a shaking machine at room temperature (22° C.) for a period of 24 hours. At the end of this period the reaction mixture was coagulated by freezing it in a solid carbon dioxide-acetone bath. The modified rubbery product was collected, washed thoroughly with hot water and acetone to remove the potassium 3,5,7,8-tetrachloroundecafluorooctanoate and excess ester, and dried in vacuo at 35° C. Infrared analysis of the product showed strong absorption at 5.60 microns indicating the presence of the carboxyl group

in the product. The modified product was pressed at a temperature of 325° F. and at a pressure of 10,000 pounds per square inch yielding a clear rubbery sheet from which the ester modifier did not bleed or volatilize during the pressing operation.

(C) A blank run was made whereby a 30 ml. aliquot of the latex obtained by the procedure of part A of this example was shaken at room temperature (22° C.) for a period of 24 hours without the addition of any diallyl 3,5,7-trichlorononafluorosuberate modifier. Upon coagulation of the latex, the unmodified rubber was washed thoroughly with water and acetone, and dried in vacuo at 35° C. Infrared analysis of the product showed the absence of absorption at 5.60 microns thereby indicating the absence of the carboxyl group in the product. This unmodified rubbery copolymer also was considerably less soft than the modified copolymer obtained by the procedure of part B of this example.

As is apparent, the present invention relates to novel normally solid polymeric compositions having improved properties, which improved properties are brought about by contacting an ester of a perfluorohalocarboxylic acid with the polymer in the presence of a peroxy compound. The properties of high molecular weight polymers of fluorochloroolefins having at least 2 fluorine atoms are particularly improved by admixture with an ester of a perfluorochlorocarboxylic acid which ester does not have any deleterious effect on the desirable properties of the polymer. Various alterations and modifications of the specific amounts of ingredients and treating conditions may become apparent to those skilled in the art without departing from the scope of this invention.

I claim:

1. The process which comprises contacting a solid polymer of a fluorine-containing olefin having not more than 10 carbon atoms per molecule and an organic ester of a perfluorohalocarboxylic acid having not more than two carboxyl groups in the presence of a peroxy compound at a temperature between about 0° C. and about 150° C. in a weight ratio of said ester to said polymer between about 0.0001:1 and about 2:1 to produce a modified solid polymer.

2. The process which comprises contacting a solid polymer of a fluorine-containing olefin having not more than 10 carbon atoms per molecule and methyl 3,5,6-trichlorooctafluorohexanoate in the presence of a peroxy compound at a temperature between about 0° C. and about 150° C. in a weight ratio of said ester to said polymer between about 0.05:1 and about 2:1 to produce a modified solid polymer.

3. The process which comprises contacting a solid polymer of a fluorine-containing olefin having not more than 10 carbon atoms per molecule and octyl 3,5,7,8-tetrachloroundecafluorooctanoate in the presence of a peroxy compound at a temperature between about 0° C. and about 150° C. in a weight ratio of said ester to said polymer between about 0.05:1 and about 2:1 to produce a modified solid polymer.

4. The process which comprises contacting a solid polymer of a fluorine-containing olefin having not more than 10 carbon atoms per molecule and dioctyl 3,5,7-trichlorononafluorosuberate in the presence of a peroxy compound at a temperature between about 0° C. and about 150° C. in a weight ratio of said ester to said polymer between about 0.05:1 and about 2:1 to produce a modified solid polymer.

5. The process which comprises contacting a solid polymer of a fluorine-containing olefin having not more than 10 carbon atoms per molecule and an unsaturated organic ester of a perfluorohalocarboxylic acid having not more than two carboxyl groups in the presence of a peroxy compound at a temperature between about 0° C. and about 150° C. in a weight ratio of said ester to said polymer between about 0.05:1 and about 2:1 to produce a modified solid polymer.

6. The process which comprises contacting a solid polymer of a fluorine-containing olefin having not more than 10 carbon atoms per molecule and allyl 3,5,6-trichlorooctafluorohexanoate in the presence of a peroxy compound at a temperature between about 0° C. and about 150° C. in a weight ratio of said ester to said polymer between about 0.05:1 and about 2:1 to produce a modified solid polymer.

7. The process which comprises contacting a solid polymer of a fluorine-containing olefin having not more than 10 carbon atoms per molecule and diallyl 3,5,7-trichlorononafluorosuberate in the presence of a peroxy compound at a temperature between about 0° C. and about 150° C. in a weight ratio of said ester to said polymer between about 0.05:1 and about 2:1 to produce a modified solid polymer.

8. The process which comprises contacting an aqueous dispersion of a solid polymer of a fluorine-containing olefin having not more than 10 carbon atoms per molecule and an organic ester of a perfluorohalocarboxylic acid having not more than two carboxyl groups in a weight ratio of said ester to said polymer between about 0.05:1 and about 2:1 in the presence of a peroxy compound in a weight ratio of peroxy compound to said polymer between about 0.001:1 and about 0.2:1 at a temperature between about 0° C. and about 150° C., to produce a modified solid polymer.

9. The process which comprises contacting an aqueous dispersion of a solid polymer of a fluorine-containing olefin having not more than 10 carbon atoms per molecule and an organic ester of a perfluorohalocarboxylic acid having not more than two carboxyl groups in a weight ratio of said ester to said polymer between about 0.1:1 and about 1:1 in the presence of a peroxy compound in a weight ratio of peroxy compound to said polymer between about 0.01:1 and about 0.1:1 at a temperature between about 10° C. and about 50° C., to produce a modified solid polymer.

10. The process which comprises treatment of an aqueous dispersion of a solid polymer of a fluorochloroolefin containing at least 2 fluorine atoms and not more than 10 carbon atoms per molecule and an organic ester of a perfluorochlorocarboxylic acid having not more than two carboxyl groups and between about 7 and about 40 carbon atoms per molecule in the presence of a water soluble peroxy compound at a temperature between about 0° C. and about 150° C. in a weight ratio of said ester to said polymer between about 0.05:1 and about 2:1 to produce a modified solid polymer of said fluorochloroolefin.

11. The process which comprises contacting an aqueous dispersion of the thermoplastic homopolymer of trifluorochloroethylene and an organic ester of a perflurochlorocarboxylic acid having not more than two carboxyl groups in the presence of a water soluble peroxy compound at a temperature between about 0° C. and about 150° C. in a weight ratio of said ester to said polymer between about 0.05:1 and about 2:1 to produce a modified solid thermoplastic homopolymer of trifluorochlorethylene.

12. The process which comprises contacting an aqueous dispersion of the elastomeric copolymer of trifluorochloroethylene and vinylidene fluoride containing between about 30 and about 50 mol percent of combined trifluorochloroethylene and an organic ester of a perfluorochlorocarboxylic acid having not more than two carboxylic groups in the presence of a water soluble peroxy compound at a temperature between about 0° C. and about 150° C. in a weight ratio of said ester to said polymer between about 0.05:1 and about 2:1 to produce a modified elastomeric copolymer.

13. The novel composition of matter which comprises a mixture of a solid polymer of a fluorine-containing olefin having not more than 10 carbon atoms per molecule and an unsaturated organic ester of a perfluorohalocarboxylic acid having not more than two carboxyl groups, the weight ratio of said ester to said polymer being between about 0.0001:1 and about 2:1.

14. The novel composition of matter which comprises a mixture of a solid polymer of a fluorochloroolefin containing at least 2 fluorine atoms having not more than 10 carbon atoms per molecule and an unsaturated organic ester of a perfluorochlorocarboxylic acid having not more than two carboxyl groups and between about 7 and about 40 carbon atoms per molecule and at least 2 fluorine atoms for every chlorine atom, the weight ratio of said ester to said polymer being between about 0.0001:1 and about 2:1.

15. The novel composition of matter which comprises a mixture of the thermoplastic homopolymer of trifluorochloroethylene and an unsaturated organic ester of a perfluorochlorocarboxylic acid having not more than two carboxyl groups, the weight ratio of said ester to said polymer being between about 0.05:1 and about 2:1.

16. The novel composition of matter which comprises a mixture of the elastomeric copolymer of trifluorochloroethylene and vinylidene fluoride containing between about 30 and about 50 mol percent of combined trifluorochloroethylene and an unsaturated organic ester of a perfluorochlorocarboxylic acid having not more than two carboxyl groups, the weight ratio of said ester to said copolymer being between abut 0.05:1 and about 2:1.

17. The novel composition of matter which comprises a mixture of a solid polymer of a fluorine-containing olefin having not more than 10 carbon atoms per molecule and allyl 3,5,6-trichlorooctafluorohexanoate, the weight ratio of said allyl ester to said polymer being between about 0.05:1 and about 2:1.

18. The novel composition of matter which comprises a mixture of a solid polymer of a fluorine-containing olefin having not more than 10 carbon atoms per molecule and diallyl 3,5,7-trichlorononafluorosuberate, the weight ratio of said diallyl ester to said polymer being between about 0.05:1 and about 2:1.

19. The novel composition of matter which comprises a mixture of the thermoplastic homopolymer of trifluorochloroethylene and diallyl perfluorochlorosuberate in a weight ratio of said diallyl ester to said polymer of between about 0.1:1 and about 1:1.

20. The novel composition of matter which comprises a mixture of the elastomeric copolymer of trifluorochloroethylene and vinylidene fluoride containing between about 30 and about 50 mol percent of combined trifluorochloroethylene and diallyl perfluorochlorosuberate in a weight ratio of said diallyl ester to said copolymer of between about 0.1:1 and about 1:1.

References Cited in the file of this patent

UNITED STATES PATENTS 2,559,752    Berry  ---------------- July 10, 1951